Aug. 23, 1927.
C. C. MEGOWN
1,640,088
SUN VISOR FOR MOTOR VEHICLES
Filed Sept. 7, 1926
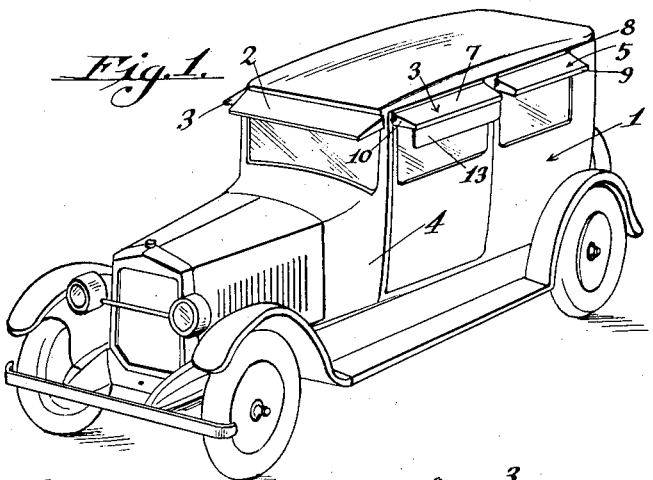
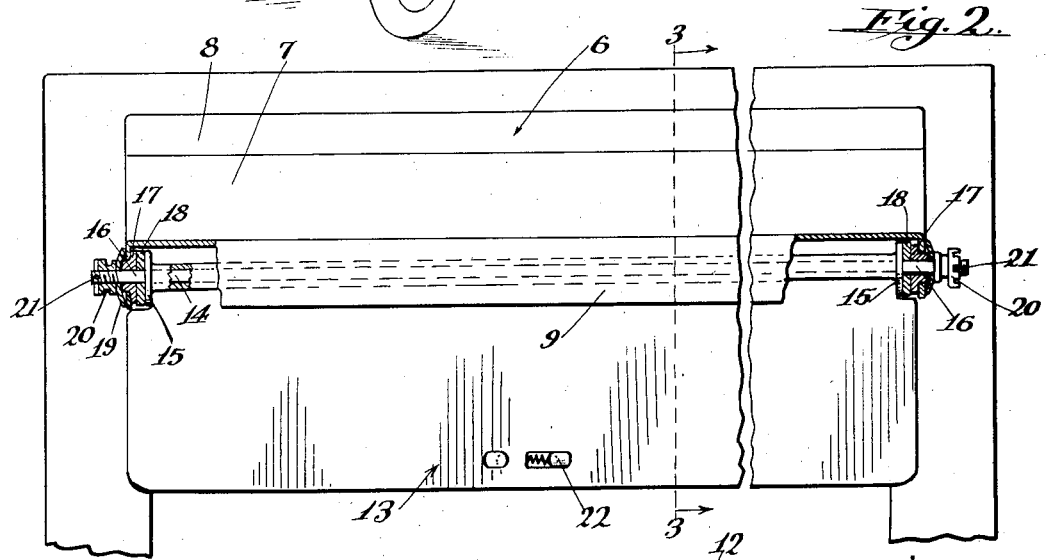
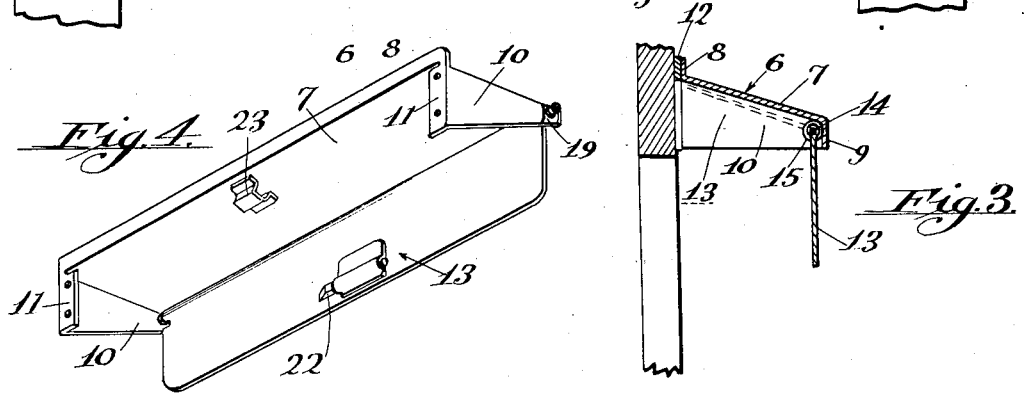
Inventor
Charles C. Megown
by Hazard and Miller
Attorneys Patented Aug. 23, 1927.

1,640,088

UNITED STATES PATENT OFFICE.

CHARLES C. MEGOWN, OF LOS ANGELES, CALIFORNIA.

SUN VISOR FOR MOTOR VEHICLES.

Application filed September 7, 1926. Serial No. 133,908.

My invention is a sun visor for motor vehicles to give a shade from the sun on the sides of a closed vehicle as well as on the front, and having a drop leaf to hang downwardly from the visor to give better protection from the glare of the sun when it is low in the sky or from other objectionable lights. The drop leaf is secured to the outer edge of the visor and when hanging downwardly is substantially vertical. This leaf is designed to be held in adjusted position by frictional means and when folded upwardly in the visor is secured by a lock.

My invention is illustrated in the following drawings, in which;

Figure 1 is a perspective view of a motor vehicle showing my sun visor attached thereto;

Fig. 2 is a side elevation partly broken away of the visor with the drop leaf hanging downwardly;

Fig. 3 is a vertical transverse section on the line 3—3 of Fig. 2, in the direction of the arrows;

Fig. 4 is an inside perspective view of the visor with the drop leaf hanging down, removed from the vehicle.

In the drawings a closed type of automobile is indicated by the numeral 1, in which a front visor 2 is secured to the front of the vehicle. A visor 3 is secured to the door 4 and a visor 5 is secured to the upper part of the vehicle over the rear side window. It will be understood that there will be visors on both sides of the vehicle and that all may be constructed in the same manner. The visor on the door will preferably swing outwardly when the door opens, the others being secured in a stationary manner adjacent the roof of the automobile.

The stationary part of the visor is constructed as follows, having reference particularly to Figs. 2, 3 and 4:

This stationary part is designated by the numeral 6 having a roof portion 7, an upwardly extending flange 8 and a downwardly extending flange 9. End pieces 10 are preferably formed by bending the metal forming the roof downwardly and inwardly extending flanges 11 are bent from the ends 10. These ends have screw holes therethrough so that the visor may be secured to the vehicle, there being preferably a packing 12 between the vehicle structure and the flanges. There may also be securing screws or the like through the flange 8.

The moving part of the visor is constructed substantially as follows:

A drop leaf 13 is mounted on a pivot bolt 14, said bolt having shoulders 15 at each end and having an extension stem 16 screw threaded at the end. A bushing 17 formed angular in shape is secured to the stationary structure, being attached to the end walls 10 of same. A loose washer 18 fits between the bushing and the shoulder 15. A spring washer 19 shown as being dome shaped is fitted on the end of the stem and a castellated nut 20 is utilized to compress the spring washer, this being secured in position by a cotter pin 21 in the usual manner. By this construction the nuts on each end or on one end of the visor may be tightened, compressing the spring washers and bringing a sufficient but satisfactory resilient pressure to bear on the shoulders 15 to maintain the drop leaf 15 in any desired position.

In order to retain the drop leaf in its upper or housed position as shown in dotted lines in Fig. 3, the leaf is provided with a slidable bolt 22 engaging in a socket 23, the bolt being preferably of the spring pressed type so as to hold the drop leaf hinged up in its housed position.

The manner of using my visor is believed apparent. Sufficient pressure may be brought on the spring washers so that the drop leaf will be held in substantially any desired position, even with the vehicle jolting to a considerable extent. When the glare of the sun is coming nearly horizontally through the windows the drop leaf 13 may be extended downwardly as shown in Fig. 3, and thereby block out the glare. It may also be used to block out the glare from other sources of light, such as vehicle headlights or the like. The visor with the drop leaf also functions to keep rain and snow out of the vehicle so that even in stormy weather the windows may be kept open.

Although my invention is of a relatively simple character, having few elements of construction, it will nevertheless be apparent that these features may be changed in general construction and in specific details without departing from the spirit of my invention as set forth in the description, drawings and claim.

Having described my invention, what I claim is:

A sun visor comprising in combination a fixed structure having a roof portion and end walls, means to secure same to a vehicle, a pivot bolt extending through the end walls and having shoulders inside said walls, extension stems through the walls, a bushing on each stem fitting in each end wall, a loose washer between each bushing and each shoulder, a spring washer on each stem, on the outside of each end wall, a nut on each stem bearing against each spring washer, and a drop leaf connected to the pivot bolt.

In testimony whereof I have signed my name to this specification.

CHARLES C. MEGOWN.